Nov. 22, 1966  G. K. SCHRAY  3,286,352
RETICLE FOR A SIGHTING INSTRUMENT
Filed April 20, 1964  3 Sheets-Sheet 1
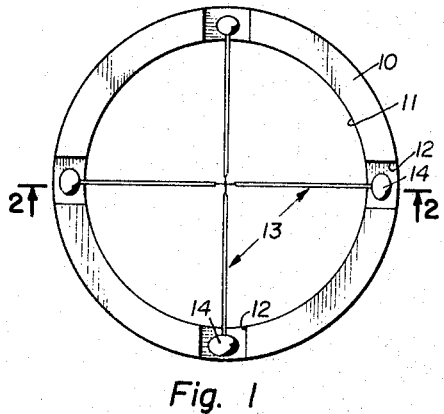
Fig. 1
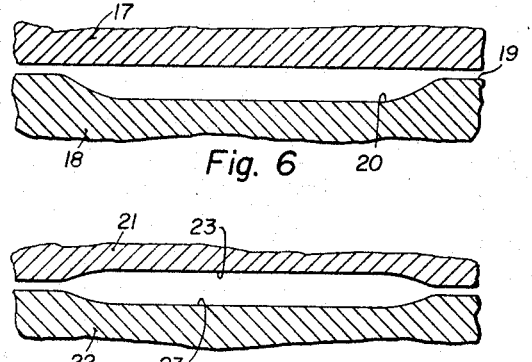
Fig. 6
Fig. 7
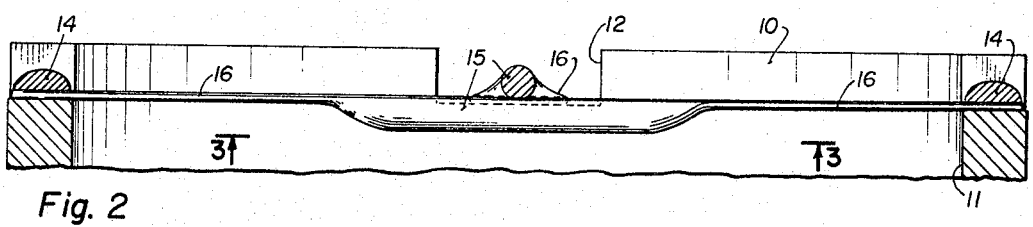
Fig. 2
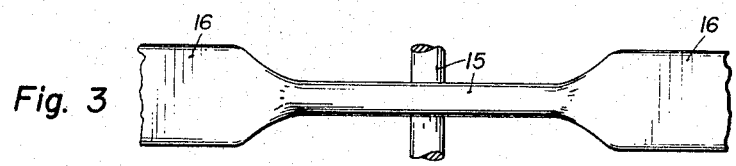
Fig. 3
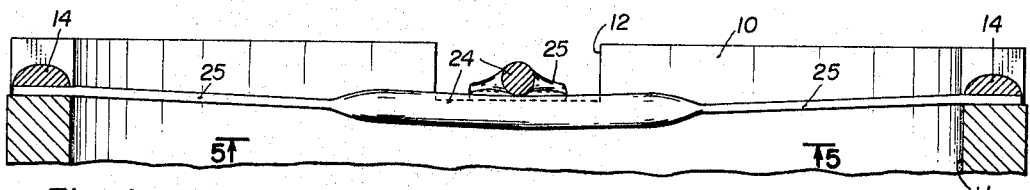
Fig. 4
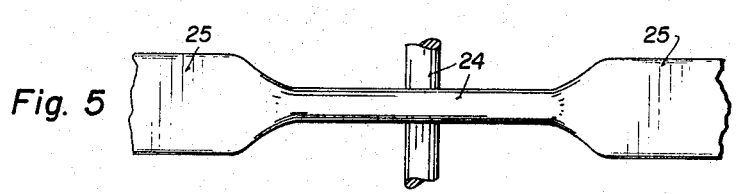
Fig. 5
INVENTOR.
GEORGE K. SCHRAY
BY
BUCKHORN, CHEATHAM & BLORE
ATTORNEYS

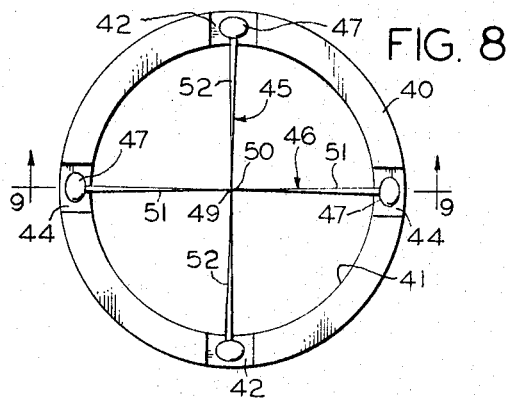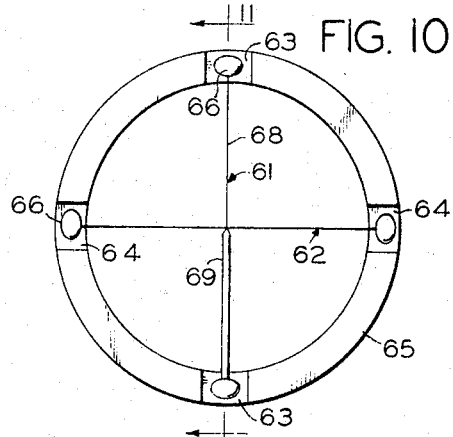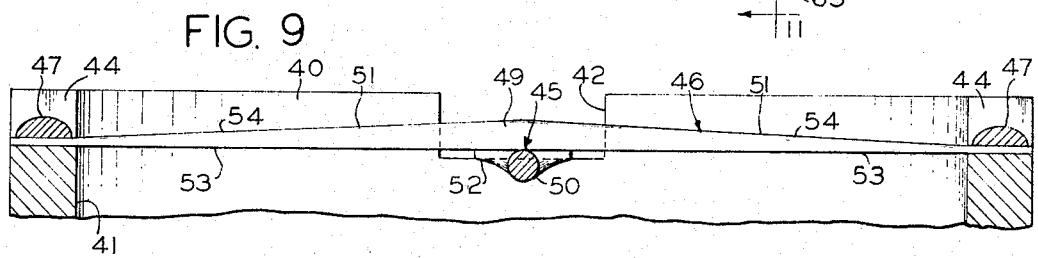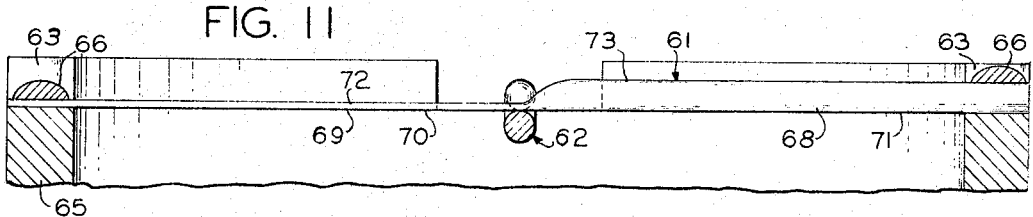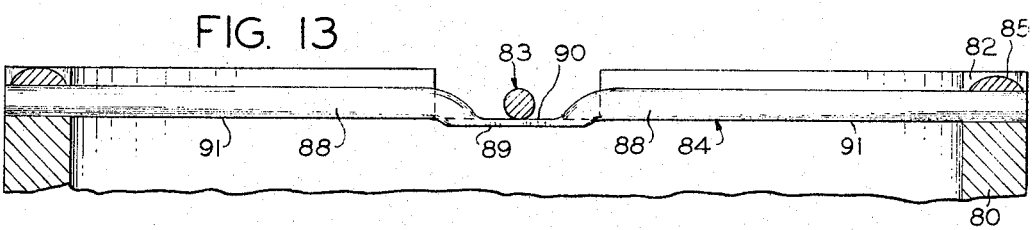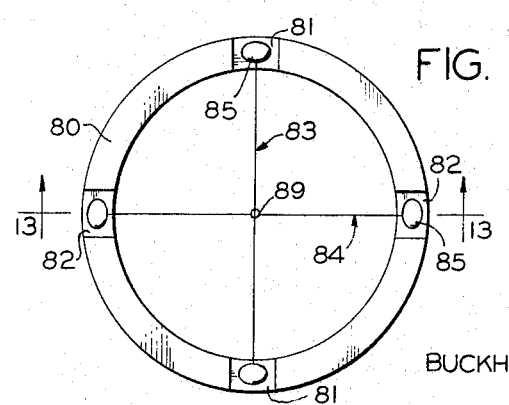

Nov. 22, 1966      G. K. SCHRAY      3,286,352

RETICLE FOR A SIGHTING INSTRUMENT

Filed April 20, 1964      3 Sheets-Sheet 3

*INVENTOR.*
GEORGE K. SCHRAY

BY

BUCKHORN, BLORE, KLARQUIST & SPARKMAN

ATTORNEYS

United States Patent Office 3,286,352
Patented Nov. 22, 1966

3,286,352
RETICLE FOR A SIGHTING INSTRUMENT
George K. Schray, Portland, Oreg., assignor to Leupold & Stevens Instruments, Inc., Portland, Oreg., a corporation of Oregon
Filed Apr. 20, 1964, Ser. No. 364,880
19 Claims. (Cl. 33—50)

This application is a continuation-in-part of my co-pending application Serial No. 175,073, filed February 23, 1962, now abandoned.

My present invention comprises reticles for sighting instruments wherein extreme accuracy of manufacture of the filaments to desired specifications may be easily achieved. One of the reticles is of the type in which a very fine filament portion is provided at and near the optical center of the instrument and broader filament portions are provided in the surrounding field of view. Such a reticle is of extreme value in a rifle scope, for instance, since the broad outer portions of the filaments immediately direct the eye to the central point along the line of sight, but the finer portions at and near the optical center do not obscure the target.

Attempts have been made to provide reticles with similar characteristics such as by etching a glass plate, by twisting a flat wire, or by progressively reducing the diameter of a wire toward its central point, such as by progressively immersing a wire in an acid. All such attempts produce reticles which have inherent objections. For example, a twisted flat wire is likely to turn sideways at the center when the pressure of a crosswire is applied thereto. Glass plates inherently cut down the passage of light through the instrument and produce aberrations, and the accuracy which can be achieved by etching a glass plate is relatively poor. Acid-reduced wires cannot be accurately formed and are likely to break at the reduced center point. All such objections are overcome by the present invention which provides reticles having strong, accurately formed filaments which may be accurately placed in the focal plane at the filament area.

The present invention may be more readily understood by reference to the following specification taken in connection with the accompanying drawings, wherein like numerals refer to like parts throughout, and in which two forms of the present invention and the methods of manufacture of the filaments thereof are illustrated and described.

FIG. 1 is an enlarged view of a typical reticle of the present invention, the filaments thereof being enlarged disproportionately for purposes of illustration;

FIG. 2 is a vertical section taken substantially along line 2—2 of FIG. 1, with the parts being greatly and disproportionately enlarged for the purpose of clearly explaining the invention;

FIG. 3 is a partial view taken from the plane of line 3—3 of FIG. 2;

FIG. 4 is a view similar to FIG. 2 showing a modified form of filament;

FIG. 5 is a view similar to FIG. 3 taken from the plane of the line 5—5 of FIG. 4;

FIG. 6 is a partial cross section taken on a greatly enlarged scale through the anvil and ram of a press for forming the filament of FIG. 2;

FIG. 7 is a similar view of apparatus for forming the filament of FIG. 4;

FIG. 8 is an enlarged view of a reticle forming an alternate embodiment of the invention;

FIG. 9 is a fragmentary, vertical sectional view taken along line 9—9 of FIG. 8;

FIG. 10 is an enlarged view of a reticle forming an alternate embodiment of the invention;

FIG. 11 is a fragmentary, vertical sectional view taken along line 11—11 of FIG. 10;

FIG. 12 is an enlarged view of a reticle forming an alternate embodiment of the invention;

FIG. 13 is a fragmentary, vertical sectional view taken along line 13—13 of FIG. 12;

Figure 14:
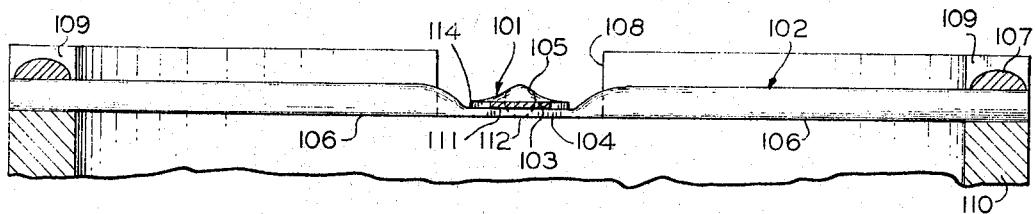
FIG. 14 is a fragmentary, vertical sectional view of a reticle forming an alternate embodiment of the invention.

FIG. 1 illustrates a typical reticle comprising a mounting member in the shape of a ring 10 having a concentric opening 11 therethrough, the member being adapted to be mounted in a sighting instrument in such manner that the axis of the ring coincides with the line of sight. The ring is provided with a plurality of notches 12 in one edge in which the ends of a pair of filaments 13 are secured as by means of drops of solder 14. A typical reticle is illustrated, in which a pair of filaments cross at right angles, but it is to be appreciated that a single filament may be utilized in cooperation with a rigid post, or that a greater number of filaments might be utilized in some types of instruments.

Each filament is preferably formed of a malleable metal such as nickel-silver alloy, which has been drawn through a die so as initially to be cylindrical and of uniform diameter throughout its length. Each filament comprises a central section 15 which is of the original configuration as drawn through the die, so that a short portion of the filament extending from the axis of the ring equidistantly toward opposite sides is in its original configuration of a drawn, cylindrical wire. Both outer portions 16 have been uniformly and equally flattened throughout by pressing such outer portions between a ram 17 and an anvil 18. Suitable stops (not shown) limit the approach of the ram to the anvil as indicated by the space 19, which is equal to the desired thickness of the outer portions of the wire 16 in the direction parallel to the optical axis of the instrument. The central portion of one of the pressing members, for example the anvil 18, is provided with a faired recess 20 of the same depth as the diameter of the central portion 15 of the filament, or slightly in excess thereof, whereby the filament will be formed with flattened outer portions with respect to which the central portion 15 is offset in the direction of application of pressure, with the outer portions faired into the central portion.

Typical dimensions for a filament for a rifle scope mounted in a member 10 having an internal diameter of three-quarters of an inch, are as follows: The original diameter of the wire, and hence of the central portion 15, is .0012 inch. The length of the central portion 15 is substantially .04 inch. The thickness of the outer portions 16 is approximately .0003 inch, and the width of the outer portions 16 is approximately .0035 inch. In forming the filament the outer portions are allowed to spread laterally so that the filament is not appreciably elongated by the pressing action, if at all, and the cross-sectional area of the outer portions 16, as well as of the faired portions, is substantially the same as the cross-sectional area of the central portion 15. The dimensions of the outer portions are preferably uniform throughout.

When such a wire is mounted on the member 10 it is secured in a frame or clamp so as to be drawn taut without elongating the filament. The filament is then positioned on the mounting member and the central portion centered exactly with respect thereto, then the drops of solder 14 are applied and the outer ends of the filament trimmed off. The flattened portions 16 are easily and firmly secured to the mounting member. As illustrated in FIG.

2, when two such wires are crossed they will be bowed slightly, but no more than one-half the thickness of the outer portions 16, whereby a sharply defined sighting point at the focal plane of the reticle is provided. It is to be appreciated that the usual mounting member in the form of a ring as illustrated has the filaments extending along diameters thereof. However, the invention is not limited to such a device and the filaments may be mounted in any reticle mounting member. Depending upon the type of instrument, the magnification of the various lenses, and so on, the field of view will take in some portions of the broad outer portions of the filaments, so as to direct the eye instantly toward the line of sight. It is further to be appreciated that in all views the filament is greatly magnified and the proportions thereof distorted. In an actual reticle the broad outer portions are readily visible to a person with good vision, but the central portions 15 are almost invisible without magnification.

It is perhaps possible to mold such a filament, but no practical means of accomplishing this result has been found. Perhaps it is possible to grind away the edges or otherwise reduce the width of the central portions of a flat wire so as to produce a filament having the same visual appearance in the field of view, but again no practical way has been found to accomplish this result and the resultant filament would be very weak. It might be possible to apply deforming pressure laterally to the central portion of a flat wire so as to form the central portion into a cylindrical shape, but again no practical way of producing such a result has been found. The lateral spreading of a cylindrical wire is easy to accomplish, and may be controlled to produce exactly desired results within fine tolerances.

FIGS. 4 and 5 illustrate a modified form of the invention formed by pressing apparatus such as illustrated in FIG. 7, wherein each of the pressing members, the ram 21 and the anvil 22, is provided with a faired depression 23 equal to or slightly deeper than half the diameter of the central portions 24 of the filaments. Such a filament would have flattened outer portions 25 of the same cross-sectional area as the cross-sectional area of the central portion, with the flattened portions and the central portion having the same longitudinal axis. Such a wire might be slightly stronger than the first form since the faired portions thereof are not subjected to as much distortion. As illustrated in grossly magnified and distorted form in FIG. 4, the effect of crossing two such filaments under tension in a mounting member is substantially the same, since the point of contact of the two filaments is in the same relative position as in the first modification.

It is to be appreciated that the dimensions given above are those of one practical embodiment, in which the outer portions of the filament have been widened to substantially three times the diameter of the inner portion of the filament and have been compressed to thicknesses of substantially one-quarter the diameter of the inner portion.

The wire may obviously be flattened to a greater or lesser extent. Also, it will be seen that, using the exact numerical figures given above, the formulas for calculating the cross-sectional areas will not work out exactly. If we assume, for example, that the outer portions are rectangular, the area thereof would be the product of the width times the thickness, or three times the diameter of the central portion multiplied by one-quarter of the diameter of the central portion, which equals three-quarters of the diameter of the central portion to the second power ($¾D^2$). The cross-sectional area of the central portion would be the radius squared multiplied by 3.1416, or $$\frac{3.1416}{4} \times D^2$$

The flattened portion, however, is not exactly rectangular in cross section, having rounded edges. Therefore, the exact width of each flattened outer portion, in order to comply with the formula, should be an amount slightly in excess of 3.1416 times the diameter of the second central portion, approximately .0038 plus one or two ten-thousandths of an inch, if the thickness of the outer portion is exactly one-fourth the diameter of the central portion. The specific dimensions given are as close as can be measured with available instruments. When I state that the cross-sectional area of the flattened outer portion is uniform throughout and the same as the cross-sectional area of the cylindrical inner portion, I mean to allow for manufacturing tolerances both in the creation of the ram and anvil for compressing the filament and in the controlling of the pressing action. Obviously the flattened portion will vary slightly along its length due to such tolerances, but the area at any cross section must equal the cross-sectional area of the cylindrical portion, with the possibility that some slight extension of the filament occurs but which cannot be measured with available instruments.

A recticle forming an alternate embodiment of the invention shown in FIGS. 8 and 9 includes a ring 40 having a concentric opening 41 therethrough which is adapted to be mounted in a sighting instrument in such a manner that the axis of the ring coincides with the line of sight. The ring has notches 42 and 44 therein in which the ends of filaments 45 and 46 are secured by solder drops 47. The filaments 45 and 46 have cylindrical wire central sections 49 and 50, respectively, which are short. Extending from the short sections 49 and 50, are positioned elongated tapered or flattened portions 51 and 52 of the filaments 45 and 46, respectively. Preferably the tapered portions 51 are provided with flat, bottom surfaces 53 which lie in a single plane, and flat, top surfaces 54 of the tapered sections 51 slope in opposite directions from the top of the cylindrical section 49. The filament 45 is similarly formed but is inverted relative to the filament 46 and is, of course, at right angles to the filament 46. The bottoms of the notches 42 are spaced downwardly, as viewed in FIG. 9, somewhat from the bottoms of the notches 44 to accommodate for the thickness of the flattened end portions of the filament 45 and permit the top of the filament 45 to lie in a single horizontal plane. The recticle of FIGS. 8 and 9 has, in effect, four arrows pointing to the crossover or center of the reticle, which aid in directing the user of the scope in placing the crosshairs on target. The filaments 45 and 46 are formed by dies complementary thereto in a pressing or swaging operation from round wire but, of course, may also be formed from wire of square or rectangular or other cross-sectional shape.

In a reticle forming an alternate embodiment of the invention shown in FIGS. 10 and 11, filaments 61 and 62 are secured in notches 63 and 64 in a ring 65 by drops of solder 66. The filament 62 is a wire rod of circular or other desired transverse cross section in which the width does not differ greatly from the thickness, and the filament 61 includes a section 68 of similar transverse cross section, which crosses over the filament 62. Just below the filament 62, as viewed in FIG. 10, there is provided a lower section 69 of the filament 61 which is flattened and widened to present a heavy bar or arrow pointing to the crossover. As illustrated in FIG. 11, the section 69 is formed with bottom surface 70 thereof lying in the same plane as bottom portion 71 of cylindrical section 68, and flat, top surface 72 of the section 69 is depressed below the top portion 73 of the cylindrical section 68. While the section 69 is shown as being of uniform width for the major portion of its length and having a slightly rounded or tapered portion joining the section 68, the section 69 may, of course, be tapered from a narrow portion at its upper end to a wide portion at its lower end.

A reticle shown in FIGS. 12 and 13 forming an alternate embodiment of the invention includes a ring 80 having notches 81 and 82 through the bottoms of which the ends of filaments 83 and 84 are secured by drops of solder 85. The filament 83 is of uniform cross section throughout its length and preferably is of circular cross section.

The filament 84 has elongated, cylindrical sections 88 extending from a compressed, flattened and widened central section or dot 89 positioned at the crossover of the filaments 83 and 84, the section 89 being depressed in its formation so that the top surface 90 thereof is in the same plane as bottom portions 91 of the sections 88 and the bottom surface of the filament 83 engages the top surface 90 of the flattened section 89 without depressing the filament 84. The flattened section 89 forms a dot at the crossover which is several times larger in diameter than the diameter of the sections 88 and the filament 83 so that the section 89 forms a dot to the viewer. This enables the user to readily locate the crossover of the filaments 83 and 84 and place the crossover on target.

In FIG. 14 there is shown a reticle forming an alternate embodiment of the invention, which is identical to the reticle of FIGS. 12 and 13 except that both filaments 101 and 102 have flattened, widened, circular sections 103 and 104, respectively, which overlap each other and separate narrow, cylindrical sections 105 and 106 of the filaments 101 and 102, respectively. The ends of the filaments 101 and 102 are secured by solder drops 107 in notches 108 and 109 in a ring 110. The filament 101 was originally of cylindrical configuration throughout its length, the same size as the elongated sections 105, and the flattened section 103 is formed with lower surface 111 thereof positioned upwardly beyond lower surface 112 of the elongated cylindrical section 105 to provide clearance for the flattened section 104 which has upper surface 114 depressed downwardly to similarly provide clearance for the flattened section 103. Thus, the filaments 101 and 102 cross over each other without deflecting each other.

Figure 15:
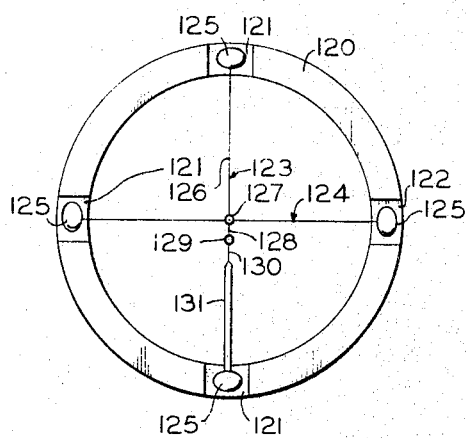
FIGS. 15 and 16 are enlarged views of reticles forming alternate embodiments of the invention.

A reticle forming an alternate embodiment of the invention shown in FIG. 15 includes a ring 120 having notches 121 and 122 therein in which ends of filaments 123 ad 124 are secured by solder drops 125. The filament 124 preferably is of cylindrical cross section throughout its length, while the filament 123 has an elongated, cylindrical portion 126, a widened, circular central section or dot 127 similar to the section 89 of the filament 84 (FIG. 13), a short, narrow, cylindrical section 128, a flattened, widened circular section or dot 127, a short, narrow, cylindrical section 130 and a flattened, widened, elongated lower section or dot 131, which is generally similar to the section 69 of the filament 61 (FIG. 10). The section 129 is spaced a predetermined distance below the crossover of the filaments 123 and 124 at which the section 127 is positioned, and is used to obtain an indication of elevation of a rifle with which the reticle of FIG. 15 is used. For example, the section 129 may be so positioned relative to the dot 127 that, when the section 129 is placed on a target 400 yards away it will compensate for the elevation. The section 131 forms, in effect, an arrow to bring the user's eye onto either the section 127 or the section 129.

Figure 16:
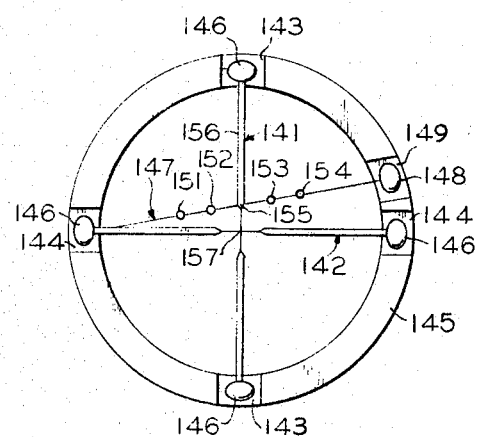

In a reticle forming an alternate embodiment of the invention shown in FIG. 16, a pair of filaments 141 and 142 corresponding to the filaments 13 of the reticle of FIG. 1 are secured in notches 143 and 144 in a mounting ring 145, by drops of solder 146. The filaments 141 and 142 form a reticle with the ring 145 substantially identical to the reticle of FIG. 1. However, there is provided a stadia filament 147 in the reticle which is secured in the lefthand notch 144 and a notch 149 positioned above the righthand notch 144. The filament 147 is secured by the lefthand drop of solder 146 in the notch 144 and by a drop of solder 148 in the notch 149. Widened, flattened circular sections or dots 151, 152, 153 and 154, along with rounded lower end portion 155 of the upper, flattened section 156 of the filament 141 are precisely positioned relative to the crossover of the filaments 141 and 142 to form stadia dots, and are spaced equidistantly apart. Each dot 151 to 154 and the portion 155 indicates a particular compensation to be effected for elevation. In using the rifle having the scope of which the reticle of FIG. 16 forms a part, the user places crossover 157 on the target, notes the position of the one of the stadia dots 151 to 154 and the portion 155 which is appropriate for the distance of the target from the user, and then raises the rifle until the crossover 157 is positioned at that elevation. The rifle then will be properly aimed. The lefthand end of the filament 147 crosses over the lefthand end of the filament 142 at a precise portion of the lefthand notch 144 and each of the dots 151 to 154 and the portion 155 is located above the filament 142 in proportion to the spacing thereof from the lefthand end of the filament 147 and also its vertical position is dependent upon its spacing from the filament 141. The stadia dots 151 to 154 also provide for windage compensation, being spaced predetermined distances from the filament 141.

Having illustrated and described preferred embodiments of the invention, it should be apparent to those skilled in the art that the invention permits of modification in arrangement and detail. I claim as my invention all such modifications as come within the true spirit and scope of the following claims.

What is claimed is:

1. A reticle for a sighting instrument comprising a supporting member having an opening therethrough,
   and a filament secured to said member and spanning said opening,
   said filament comprising a central, cylindrical portion and integral outer portions,
   each of said outer portions having the same cross-sectional area as said central portion with a major axis greater than the diameter of said central portion and a minor axis lesser than the diameter of said central portion,
   said major axes lying transversely with respect to the axis of said opening.

2. A reticle for a sighting instrument comprising a supporting ring,
   and a filament mounted on said ring and spanning said ring along a diameter thereof,
   said filament comprising a central, cylindrical portion and integral, flattened outer portions,
   each of said outer portions having the same cross-sectional area as said central portion with a major axis greater than the diameter of said central portion and a minor axis lesser than the diameter of said central portion,
   said major axes lying transversely with respect to the axis of said ring.

3. A reticle for a sighting instrument comprising a supporting member having a cylindrical opening therethrough and adapted to be placed in a sighting instrument with the axis of said opening coinciding with the line of sight of the instrument,
   and a filament of malleable metal fixed to and spanning said ring,
   said filament comprising a central, cylindrical portion extending equidistantly in both directions from the axis of said opening and integral outer portions,
   each of said outer portions having the same cross-sectional area as said central portion with a major axis greater than the diameter of said central portion and a minor axis lesser than the diameter of said central portion,
   the major axes of said outer portions lying transversely with respect to the axis of said ring.

4. A reticle for a sighting instrument comprising a supporting ring,
   and a filament mounted on said ring and spanning said ring along a diameter thereof,
   said filament comprising a central, cylindrical portion and integral, flattened outer portions,
   each of said outer portions having the same cross-sectional area as said central portion with a major axis greater than the diameter of said central portion and a minor axis lesser than the diameter of said central portion,
said major axes lying transversely with respect to the axis of said ring,
and the axis of said central portion being offset toward one side of the longitudinal axes of said outer portions in the direction of the axis of said ring.

5. In a reticle,
a crosshair filament having a pair of ribbon-like portions lying in the same plane when unstressed and each having a predetermined width,
the crosshair filament also having a central section connected directly to the ribbon-like portions and having no transverse dimension greater than a small fraction of said predetermined width,
the crosshair filament being substantially uniform in transverse cross sectional area throughout the length thereof,
and a reticle support having an opening therethrough extending along and encompassing a line of sight and holding the filament in a position extending transversely across the opening and being in the field of view with the plane of said ribbon-like portions of the filament perpendicular to said line of sight.

6. In a reticle,
filament-supporting means having an opening surrounding a line of sight and extending in a predetermined direction parallel to said line of sight,
and a filament extending across and having a ribbon-like portion having a predetermined width and lying in a plane transverse to said direction and visible in the opening,
the filament also having a portion also visible in the opening and connected directly to the ribbon-like portion and having no transverse dimension greater than a small fraction of said predetermined width,
the filament being substantially uniform in transverse cross-sectional area throughout the portion thereof visible in the opening.

7. In a reticle,
a crosshair filament substantially uniform in transverse cross-sectional area throughout its length and having a flat, ribbon-like portion having a predetermined width and also having an unflattened portion joining the ribbon-like portion and having no transverse dimension greater than a small fraction of said predetermined width,
and a reticle support having an opening therethrough extending in a predetermined direction along and surrounding a line of sight and holding the filament in a visible position extending across the opening with the plane of the ribbon-like portion of the filament perpendicular to said direction.

8. In a reticle,
a reticle support having an opening surrounding a line of sight and extending in a predetermined direction parallel to said line of sight,
and a pair of crosshair filaments carried by the support in crossing over positions and extending across and visible in said opening,
each filament being of substantially uniform cross-sectional area throughout its length,
at least one of the filaments having a flattened portion visible in the opening and having a predetermined width and a thickness several times smaller than said width and also having an unflattened portion visible in the opening and joining the ribbon-like portion and having no transverse dimension greater than a small fraction of said predetermined width,
the flattened portion of said one of the filaments lying in a plane perpendicular to said direction.

9. In a reticle,
a reticle support having an opening surrounding a line of sight and extending in a predetermined direction along said line of sight,
and a pair of crosshair filaments carried by the support in visible positions spanning the opening and each filament being of substantially uniform cross-sectional area throughout its length,
each filament having an unflattened central section crossing over the central section of the other filament,
each filament having a pair of flattened, tapered sections tapering from a wide predetermined width at the outer ends thereof to a narrow width substantially narrower than said predetermined width at the junctures thereof with the central sections,
each of the central sections having no transverse dimension substantially greater than said narrow width,
the flattened, tapered sections lying in a plane transverse to said direction.

10. The reticle of claim 9 wherein the adjacent sides of both of the filaments lie in the same plane and the sides of the filaments opposite to the adjacent sides are inclined relative to the last-mentioned plane.

11. In a reticle,
a reticle support having an opening extending in a predetermined direction along a line of sight and surrounding said line of sight,
and a pair of crosshair filaments carried by the support in positions visible through the opening and crossing over each other and each of substantially uniform cross-sectional area throughout its length,
one of the filaments having a visible flattened portion of a predetermined width extending from a point near the crossover of the filaments to one end thereof and lying in a plane perpendicular to said direction,
the remainder of said one filament being visible in the opening and unflattened,
the other filament being visible in the opening and unflattened and of substantially uniform cross-sectional shape throughout its length,
at least the portions of said other filament that are visible in the opening and said remainder of said one filament having no transverse dimension greater than a small fraction of said predetermined width.

12. In a reticle,
a reticle support having an opening surrounding a line of sight and extending along said line of sight in a predetermined direction,
and a pair of crosshair filaments carried by the support in crossing over positions spanning and visible in the opening,
each filament being of substantially uniform cross-sectional area throughout its length,
the portion of at least one of the filaments at the crossover being flattened to form a dot-like section several times as wide as the thickness thereof and lying in a plane perpendicular to said direction,
the portions of the filaments adjacent to dot-like section being substantially unflattened and having no transverse dimension greater than a small fraction of the width of the dot-like section.

13. The reticle of claim 12 wherein the dot-like section of said one of the filaments is positioned at one side of the centerline of the portions of said one of the filaments adjacent thereto.

14. In a reticle,
a reticle support having an opening surrounding a line of sight and extending along said line of sight in a predetermined direction,
and a pair of crosshair filaments carried by the support in crossing over positions spanning and visible in the opening,
the visible portion of each filament being of substantially uniform cross-sectional area throughout its length,
the portions of the filaments crossing over each other being flattened to generally circular superimposed dot-like sections each having a predetermined diameter and a thickness several times smaller than said diameter, the portions of the filaments crossing over lying in adjacent planes perpendicular to said direction, the portions of the filaments adjacent the dot-like sections being substantially unflattened and having no transverse dimension greater than a small fraction of said diameter.

15. The reticle of claim 14 wherein the dot-like sections are positioned at opposite sides of the centerlines of the portions of the filaments adjacent the dot-like sections.

16. In a reticle, a reticle support having an opening surrounding a line of sight and extending along said line of sight in a predetermined direction, and a pair of crosshair filaments carried by the support in crossing over positions spanning and visible in the opening, the portion of one of the filaments visible in the opening being of substantially uniform cross-sectional area throughout its length and having a widened portion, the widened portion of said visible portion of said one of the filaments being spaced a predetermined distance from the cross over point and being flattened to provide a wide section of a predetermined width and a thickness several times smaller than said width, the widened portion of said visible portion of said one of the filaments lying in a plane substantially perpendicular to said direction, the portion of said one of the filaments extending from said widened portion of the filament toward the point of cross over of the filaments having no transverse dimension greater than a small fraction of said width.

17. In a reticle, a reticle support having an opening surrounding a line of sight and extending along said line of sight in a predetermined direction, and a pair of crosshair filaments carried by the support in positions spanning the opening crossing over at a predetermined point in the opening, the portion of one of the filaments visible in the opening being of substantially uniform cross-sectional area throughout its length and having a visible stadia portion, the stadia portion of said one of the filaments being spaced a predetermined distance from said point being flattened to provide a widened, dot-like stadia section of a predetermined diameter and a thickness several times smaller than said diameter, the dot-like stadia section lying in a plane substantially perpendicular to said direction, the portions of the filament immediately adjacent the dot-like stadia section being substantially unflattened and having no transverse dimension greater than a small fraction of said diameter.

18. In a reticle, a reticle support having an opening surrounding a line of sight and extending horizontally along said line of sight in a predetermined direction, a vertical crosshair filament carried in a vertical position spanning the opening by the support, a horizontal crosshair filament carried in a horizontal position spanning the opening by the support and crossing over the vertical crosshair filament at a predetermined point visible in the opening, and a stadia crosshair filament carried by the support in a predetermined position relative to the vertical and the horizontal crosshair filaments and spanning the opening, the stadia crosshair filament being of substantially uniform cross-sectional area throughout the portion of its length visible in the opening, the stadia visible portion of the crosshair filament having a plurality of widened, dot-like sections spaced therealong from each other and spaced predetermined distances from one of the vertical and the horizontal crosshair filaments, each dot-like section having a predetermined diameter and a thickness several times smaller than said diameter and lying in a plane substantially perpendicular to said direction, portions of the visible portion of the stadia crosshair filament adjacent the dot-like sections having no transverse dimension greater than a small fraction of said predetermined diameter.

19. In a reticle, a reticle support having an opening surrounding a horizontal line of sight and extending horizontally along said line of sight in a predetermined direction, a vertical crosshair filament carried in a vertical position extending across the opening by the support, a horizontal crosshair filament carried in a horizontal position extending across the opening by the support and crossing over the vertical crosshair filament at a predetermined point in the opening, and a stadia croshair filament carried by the support in a predetermined position extending across the opening and inclined relative to the vertical and the horizontal crosshair filaments and crossing over the vertical crosshair filament at a second point in the opening spaced a predetermined distance from said predetermined point, the visible portion of the stadia crosshair filament being of substantially uniform cross-sectional area throughout its length, the visible portion of the stadia crosshair filament having a plurality of widened, dot-like sections spaced therealong from each other and spaced different predetermined distances from the horizontal crosshair filament and different predetermined distances from the vertical crosshair filament, each dot-like section having a predetermined diameter and a thickness several times smaller than said diameter and lying in a plane substantially perpendicular to said direction, the portions of the stadia crosshair filament adjacent the dot-like sections having no transverse dimension greater than a small fraction of said predetermined diameter.

References Cited by the Examiner
UNITED STATES PATENTS

| | | | |
|---|---|---|---|
| 848,757 | 4/1907 | Lomb | 33—50.5 X |
| 3,023,504 | 3/1962 | Benford | 33—50.5 |
| 3,229,370 | 1/1966 | Plisk | 33—50.5 |

LEONARD FORMAN, *Primary Examiner.*

SAMUEL S. MATTHEWS, *Examiner.*

UNITED STATES PATENT OFFICE
CERTIFICATE OF CORRECTION

Patent No. 3,286,352                                November 22, 1966

George K. Schray

It is hereby certified that error appears in the above numbered patent requiring correction and that the said Letters Patent should read as corrected below.

Column 5, line 36, for "ad" read -- and --; column 8, lines 37 to 40, strike out "at least the portions of said other filament that are visible in the opening and said remainder of said one filament having no transverse dimension greater than a small fraction of said predetermined width." read -- at least the portions of said other filament and said remainder of said one filament that are visible in the opening having no transverse dimension greater than a small fraction of said predetermined width. --; column 10, line 8, for "the stadia visible portion of the crosshair filament hav-" read -- the visible portion of the stadia crosshair filament hav- --; line 31, for "croshair" read -- crosshair --.

Signed and sealed this 12th day of September 1967.

(SEAL)
Attest:

ERNEST W. SWIDER                                  EDWARD J. BRENNER
Attesting Officer                                 Commissioner of Patents